United States Patent Office 3,738,859
Patented June 12, 1973

3,738,859
CONVEYOR BELTING
Arthur Ernest Anderson, Hull, Michael John Roberts, Thorngumbald, near Hull, and Peter John Wright, Hull, England, assignors to J. H. Fenner & Co. Limited, Marfleet, Hull, England
No Drawing. Filed Feb. 3, 1971, Ser. No. 112,435
Claims priority, application Great Britain, Feb. 5, 1970, 5,471/70
Int. Cl. F16g 1/04
U.S. Cl. 117—76 T                              4 Claims

ABSTRACT OF THE DISCLOSURE

Conveyor belting comprising a textile carcass impregnated with polyvinyl chloride, an inner layer of polyvinyl chloride or other thermoplastics material covering the impregnated textile carass and an outer layer of a natural or synthetic rubber covering the inner layer, the rubber being so compounded that under the action of heat generated by friction at the outer surface of the belt, the rubber layer becomes detached from the textile carcass.

---

Preferably the synthetic rubber comprises a butadiene-acrylonitrile copolymer. Alternatively the rubber is natural rubber or polychloroprene rubber and contains a chlorinated hydrocarbon.

This invention relates to conveyor beltings and more particularly to fire-resistant conveyor beltings.

It is usually a primary requirement for beltings used on underground mining applications that such beltings are capable of meeting stringent safety regulations regarding the belting's fire-resistance properties. Hitherto only textile reinforced P.V.C. (polyvinyl chloride) beltings have been able to meet very high standards of fire-resistance, as demanded, for example, by the National Coal Board of Great Britain. Whilst P.V.C. beltings are entirely suitable for the majority of applications, there are occasions when a rubber, or rubber surfaced, belting would be advantageous, for instance where particularly arduous conditions of impact or abrasion are encountered or on steep inclines where a rubber surface would be desirable because of its higher coefficient of friction. Rubber, or rubber surfaced, beltings can be made fire-resistant to certain standards but, so far, it has not been found possible to produce such beltings which will meet all accepted standards of first-resistance, particularly when these standards incorporate a test known as a drum friction test in which a stationary belt is maintained in contact with a rotating drum until the belt breaks. Under these conditions rubber surfaced beltings invariably fail to meet the highest standard because of the glow that occurs due to excessive heat build-up in the rubber compound.

The object of the present invention is to provide a rubber covered, textile reinforced, P.V.C. belting which can be made fire-resistant to high standards, especially where tests relating to drum friction are involved.

According to the present invention, a conveyor belting comprises a natural or synthetic rubber surface P.V.C. impregnated and coated textile carcass in which the rubber compound is so formulated that under the action of heat generated by friction at the outer surface of the belt, a differential softening occurs at the P.V.C./textile interface causing the rubber cover and usually outer layers of P.V.C. to become detached from the textile carcass.

In a preferred form of the invention, a conveyor belting comprises in combination a P.V.C. impregnated textile carcass, a thermoplastic interlayer and an outer layer of a butadiene-acrylonitrile copolymer rubber.

Preferably the thermoplastic interlayer is P.V.C.

The P.V.C. impregnated textile carcass may be produced by any of the known methods for manufacturing fire-resistant beltings. One suitable method relating to so called solid woven beltings is described in British patent specification No. 770,524 but the carcass may equally well be formed from separate plies laminated together. Conveniently the P.V.C. may be partially gelled before applying the thermoplastic interlayer.

The interlayer, which in the preferred embodiment of the invention is of P.V.C., can be applied to one or both surfaces of the carcass, by dipping or spreading or by fusing a layer of sheet P.V.C. in a press or by some other suitable method, and subsequently gelled or partially gelled by the application of heat.

Other rubbers such as natural rubber or polychloroprene rubber may be used as the outer layer of the belt but such rubbers need to be specially compounded in order to pass the drum friction test; for example they can be compounded to pass the test if they contain a chlorinated hydrocarbon. It has surprisingly been found that butadiene-acrylonitrile rubber outer layers which do not contain a chlorinated hydrocarbon can be made to pass the drum friction test. If desired however, the flame resistance of the butadiene-acrylonitrile rubber outer layers can be increased by the inclusion of between 30 and 200 parts by weight, per 100 parts by weight of butadiene-acrylonitrile copolymer, of a chlorinated hydrocarbon containing not less than 60% by weight of chlorine.

An example of a suitably compounded butadiene-acrylonitrile rubber is given below:

|  | Parts by weight |
|---|---|
| Breon 1042 | 100.0 |
| ZnO | 5.0 |
| Stearic acid | 1.0 |
| HAF carbon black | 50.0 |
| Sulphur | 1.5 |
| Mercaptobenzthiazyl disulphide | 1.5 |
| Phenyl B naphthylamine | 1.0 |
|  | 210.0 |

(Breon 1042 is an acrylonitrile-butadiene copolymer produced by B.P. Chemicals Ltd.)

If desired, this rubber may also contain 50.0 parts by weight of Chlorparaffin 70 solid which is a chlorinated paraffin having a melting point in the range of 85° C. to 95° C.

The butadiene-acrylonitrile rubber for the outer layer of the belting, and having the composition given in the example, may be prepared in the usual manner in an internal mixer and the curatives blended in a mill. The uncured rubber stock is then calendered into sheet form and the sheet is combined into a laminate in conjunction with the carcass and interlayer. The laminating process may be carried out in a press or by some other suitable means such as rotary vulcanisation so that the rubber is cured under the action of heat and pressure. Gellation of the P.V.C. can simultaneously be completed if it has been only partially gelled during previous stages in the process.

The rubber surface layer can be applied to one or both surfaces of the belt.

It is found that a belt constructed in accordance with the present invention and using butadiene-acrylonitrile rubber as in the example but without the chlorinated hydrocarbon is capable of meeting the requisite standard of fire resistance as stipulated in N.C.B. specification No. 158/60 part No. 7.3 in relation to the fire hazard constituted by a friction drum. In operation it is found that the heat generated due to friction at the outer surface of the belt is conducted through the rubber to the P.V.C. interlayer which softens and acts as a fusible link, allowing a separation, usually at the P.V.C./textile interface, so that outer layers of P.V.C. and rubber become detached from the belt.

We claim:

1. Conveyor belting comprising a textile carcass impregnated with polyvinyl chloride, a layer of polyvinyl chloride covering the impregnated textile carcass and an outer layer of rubber covering the layer of polyvinyl chloride, said rubber being a butadiene-acrylonitrile copolymer which transfers heat generated by friction at the outer surface of the belt to the layer of polyvinyl chloride to soften and polyvinyl chloride layer and render it fusible so that the rubber layer becomes detached from the textile carcass.

2. Conveyor belting as claimed in claim 1 in which the butadiene-acrylonitrile copolymer rubber is formulated to incorporate between 30 and 200 parts by weight, per 100 parts by weight of copolymer, of a chlorinated hydrocarbon containing not less than 60% by weight of chlorine.

3. Conveyor belting as claimed in claim 1 wherein the outer layer has approximately the following composition: acrylonitrile-butadiene copolymer 100 parts by weight, zinc oxide 5 parts by weight, stearic acid 1 part by weight, carbon black 50 parts by weight, sulphur 1.5 parts by weight, mercaptobenzthiazyl disulphide 1.5 parts by weight, phenyl B napthylamine 1 part by weight.

4. Conveyor belting as claimed in claim 3 in which the composition also contains 50 parts by weight of chloronated paraffin having a melting point in the range of 85° C. to 95° C.

References Cited

UNITED STATES PATENTS

| | | | |
|---|---|---|---|
| 2,849,028 | 8/1958 | Clark et al. | 260—2.5 FP |
| 2,800,701 | 7/1957 | Watts et al. | 156—137 X |
| 3,393,115 | 7/1968 | Hainsworth et al. | 156—137 X |
| 2,515,778 | 7/1950 | Knowland | 198—DIG. 7 |
| 2,894,918 | 7/1959 | Killoran et al. | 260—2.5 FP |
| 2,984,594 | 5/1961 | Runton | 74—232 |
| 3,063,884 | 11/1962 | Glover et al. | 161—144 X |

FOREIGN PATENTS

| | | | |
|---|---|---|---|
| 240,822 | 1/1960 | Australia | 117—767 |

RALPH HUSACK, Primary Examiner

U.S. Cl. X.R.

74—231 P, 232; 117—68, 80, 136; 156—344; 161—82, 403; 198—DIG. 7